US006556314B1

(12) United States Patent
Shiraishi et al.

(10) Patent No.: US 6,556,314 B1
(45) Date of Patent: Apr. 29, 2003

(54) FACSIMILE (75) Inventors: Kenichi Shiraishi, Nara (JP); Hiroshi Kawamoto, Nara (JP); Hiroaki Takeshima, Nara (JP); Mamoru Fujii, Nara (JP); Akihiko Kumagai, Hyogo (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/325,752

(22) Filed: Jun. 4, 1999

(30) Foreign Application Priority Data

Jul. 30, 1998 (JP) ........................... 10-216029
Aug. 26, 1998 (JP) ........................... 10-240654

(51) Int. Cl.⁷ ............................................. H04N 1/40
(52) U.S. Cl. ..................................................... 358/471
(58) Field of Search ................................... 358/400, 471, 358/474, 496, 498, 296, 401, 500, 501; 250/234–236; 400/691

(56) References Cited

U.S. PATENT DOCUMENTS 5,610,720 A  *  3/1997  Fujioka et al. ............... 358/296
6,382,858 B1 *  5/2002  Nojima et al. ............... 400/691

* cited by examiner

*Primary Examiner*—Cheukfan Lee
(74) *Attorney, Agent, or Firm*—Birch, Stewart, Kolasch, & Birch, LLP.

(57) ABSTRACT

A facsimile provided with a easily detachable scanner disclosed. When a button 7 provided in a panel 6 of a facsimile body F is pushed, lower a right end 10R of a release lever 10 is depressed, and the release lever 10 is turned on a pivot 10C to raise its left end 10L, thereby boosting a bottom 11 of the scanner S. In consequence thereof, the scanner S is ached from the facsimile body F.

10 Claims, 11 Drawing Sheets

FACSIMILE

BACKGROUND OF THE INVENTION

1. Field of the Invention

The present invention relates to a facsimile provided with a detachable scanner. In particular, it relates to a facsimile provided with a scanner which is easily detachable.

2. Description of the Prior Art

Conventional facsimiles include those provided with a detachable scanner. The scanner is for capturing an image to perform, for example, facsimile transmission, and copying.

Figure 10:
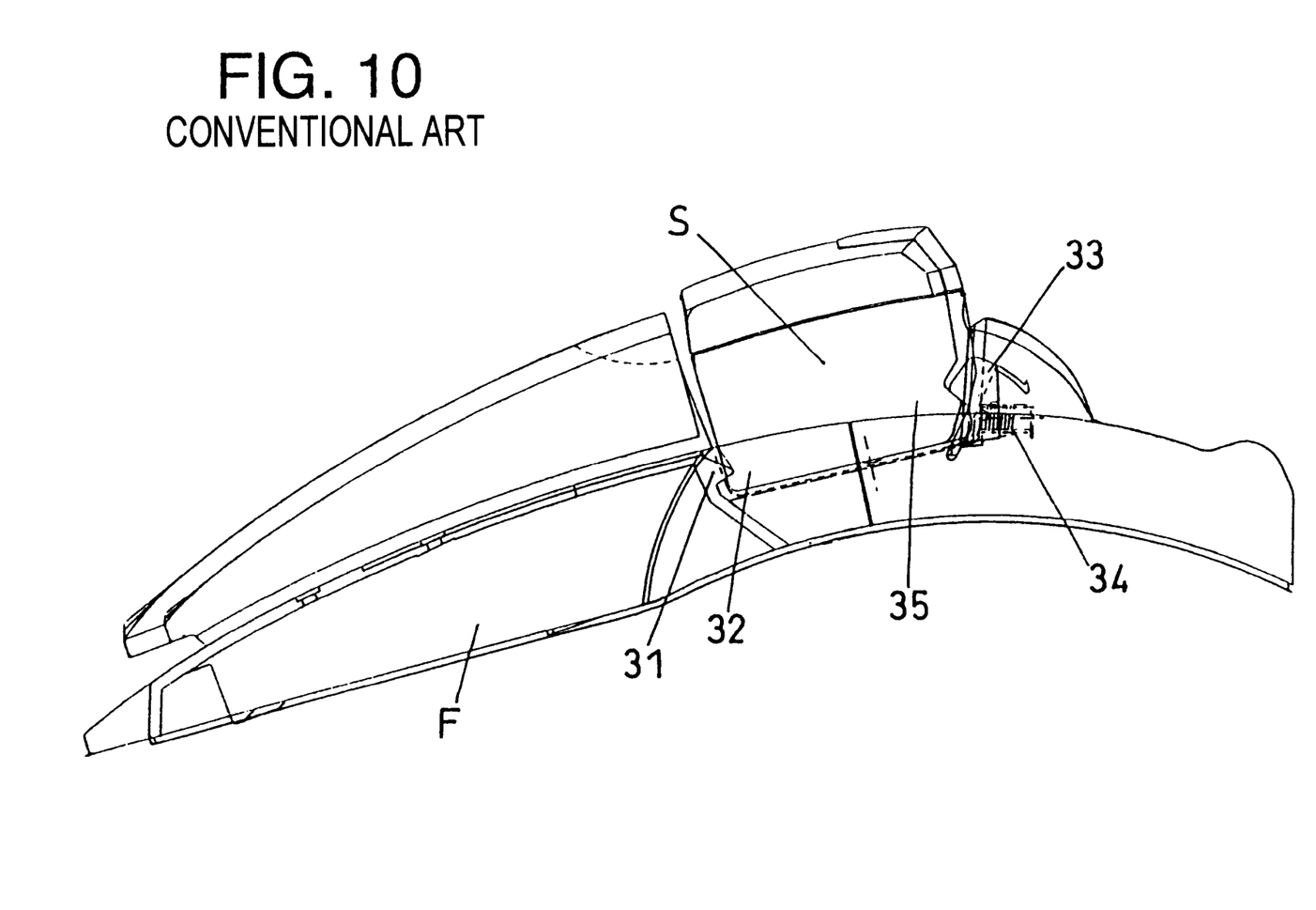
FIG. 10 is a side view of a corresponding portion of a conventional one, which shows a scanner in amounted condition.

FIG. 10 is a view which shows a facsimile body F with a scanner S mounted thereon. A latching pawl 31 formed in the facsimile body F is engaged in a first notch 32 of the scanner S to latch the scanner S, and a locking pawl 33 is biased by a spring 34 to lock a second notch 35 of the scanner S, thereby holding the scanner S mounted on the facsimile body F.

Figure 11:
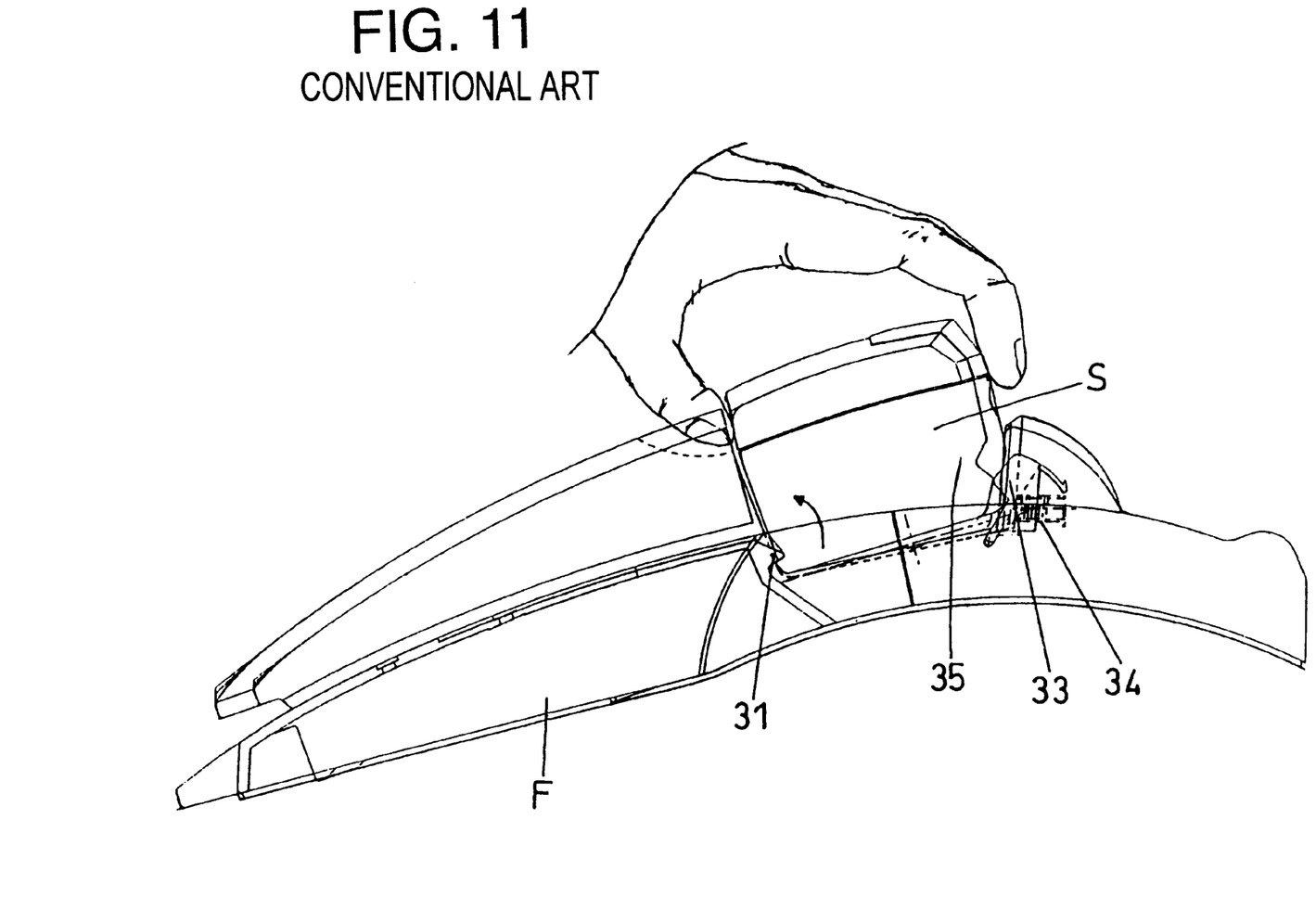
FIG. 11 is a side view of the corresponding portion of the conventional one, which illustrates operation for releasing the scanner.

FIG. 11 is a view which illustrates detaching of the scanner S from the facsimile body F with a hand. When the scanner S is directly held with a person's hand and raised pivotally on the latching pawl 31, the locking pawl 33 is withdrawn from the second notch 35 of the scanner S against the biasing force of the spring 34 to unlock the scanner S.

Figure 12:
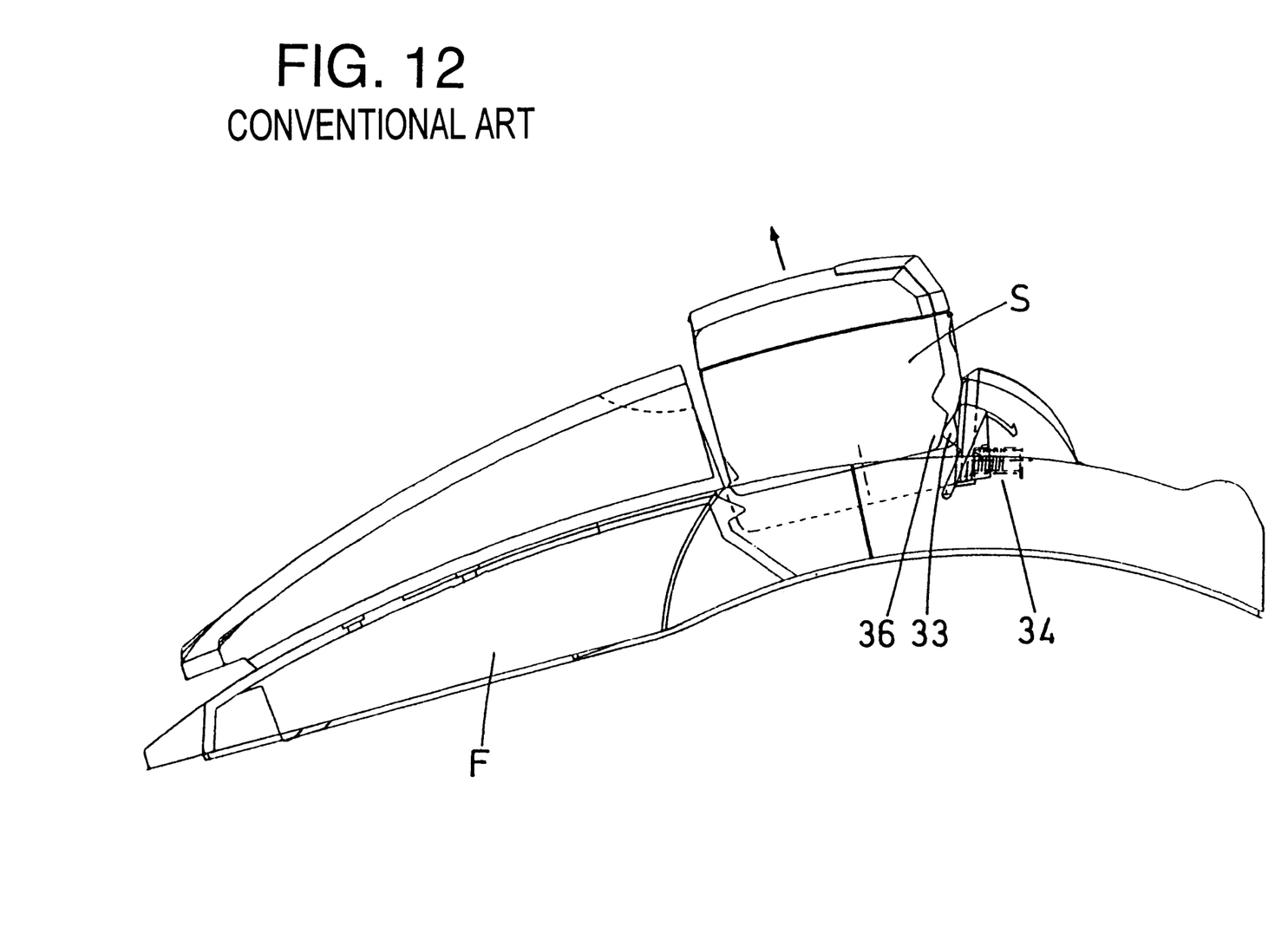
FIG. 12 is a side view of the corresponding portion of the conventional one, which shows the scanner in a temporarily held condition.

FIG. 12 is a view which shows the facsimile body F with the scanner S detached therefrom. The locking pawl 33 is stopped at a position where the spring 34 is less compressed than at the position in FIG. 10 to support a lower slope 36 of the scanner S.

In the conventional detaching mechanism, however, it is required to directly hold the scanner S with a hand. Accordingly, for convenience of the holding, there are various restrictions on the design. For example, it is necessary that the scanner S be so designed as to protrude from the top of the facsimile body F, or that a cabinet be recessed at a peripheral portion of the scanner S. Further, there is a drawback that the detaching operation is difficult to sense to a person unaccustomed thereto.

SUMMARY OF THE INVENTION

The present invention has been made to solve the above-described problems. It is, therefore, an object of the present invention to provide a facsimile which is free from the restrictions on the design and thus may be so designed as to meet user's preference and which has improved manageability.

According to the present invention, there is provided a facsimile provided with a detachable scanner, the facsimile comprising:

a locking pawl for locking the scanner under biasing force of an elastic member to hold the scanner in a facsimile body, and a release lever for unlocking the scanner against the biasing force of the elastic member.

The facsimile preferably further comprises a release button for operating the release lever, the release button having a push head substantially flush with a panel of the facsimile body, the release lever being operated by pushing said push head. Accordingly, the release lever can be operated with such a simple structure.

The facsimile preferably further comprises detection means for detecting whether or not said scanner is mounted on said facsimile body. By virtue of this, automatic switching is attained between operation mode for the mounted condition and that for the detached condition.

It is preferred that the scanner be provided with a first notch in its side opposite to the side locked by the locking pawl, and that facsimile body be provided with a latching pawl so protruding as to face the first notch for latching the first notch, and that the first notch and the latching pawl constitute a pivot when the scanner is unlocked. The one side of the scanner is thereby held with such a simple structure.

It is preferred that the scanner be provided with a second notch facing the locking pawl for receiving the locking pawl when the scanner is mounted on the facsimile body, and that the second notch, at least in part, become deeper from sides to the center. This enables the locking and the unlocking to be performed smoothly. Further, the scanner can be mounted precisely in position.

It is preferred that the scanner be provided with a second notch facing the locking pawl for receiving the locking pawl when the scanner is mounted on the facsimile body, and that the scanner be provided with a third notch at a position different from that of the second notch, and that the third notch receive the locking pawl to lock the scanner and thereby hold the scanner in the facsimile body in a manner shallower than that by means of the second notch. According to this, the scanner can be locked in an intermediate condition of detaching, thereby preventing the scanner from falling off.

The amount of the movement of said lever is preferably, at the maximum, such that said scanner is moved to unlock said second notch and to lock said third notch. Accordingly, it is ensured that the scanner is brought into the temporarily held condition.

It is preferred that when the scanner is unlocked, the locking pawl be capable of abutting on a rear lower slope of the scanner under the biasing force of the elastic member to temporarily hold the scanner with a rear portion of the scanner protruding from the panel of the facsimile body. By virtue of this, the released scanner can be taken up with ease.

This specification includes part or all of the contents as disclosed in the specification and/or drawings of Japanese Patent Application Nos. 216029/1998 and 240654/1998, which are priority documents of the present application.

DESCRIPTION OF THE PREFERRED EMBODIMENTS

In the following, preferred embodiments of the present invention will be described in detail with reference to the accompanying drawings.

Figure 8:
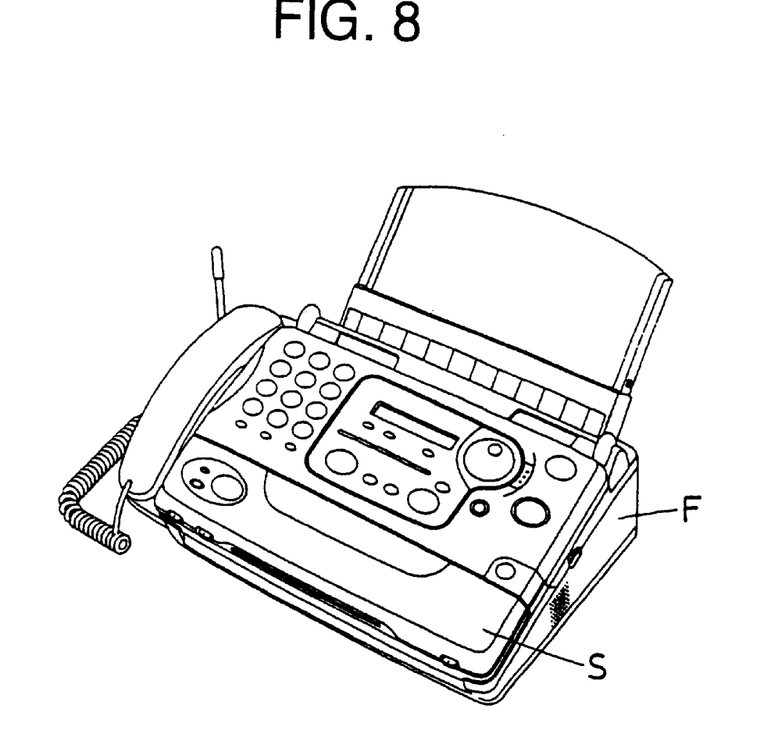
FIG. 8 is a schematic general view, in perspective, of one embodiment of the facsimile of the present invention.

FIG. 8 is a general view schematically showing a facsimile according to one embodiment of the present invention. A scanner S, which is preferably cordless, is detachably mounted on a facsimile body F.

Figure 9:
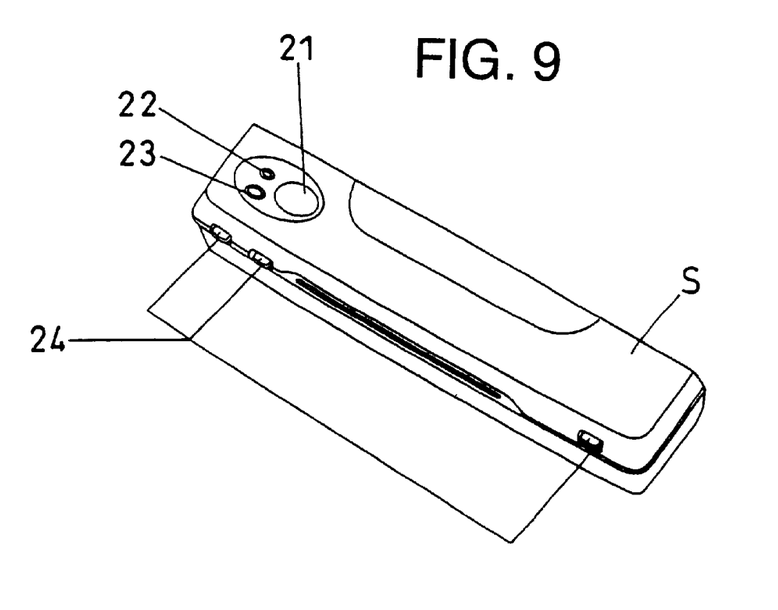
FIG. 9 is a schematic general view, in perspective, of one form of the scanner of the present invention.

FIG. 9 is a general view schematically showing the scanner S. For example, the scanner S comprises a reading start/stop key 21, a memory remainder indicating LED 22, a memory erasing key 23, and various selectors 24.

Figure 1:
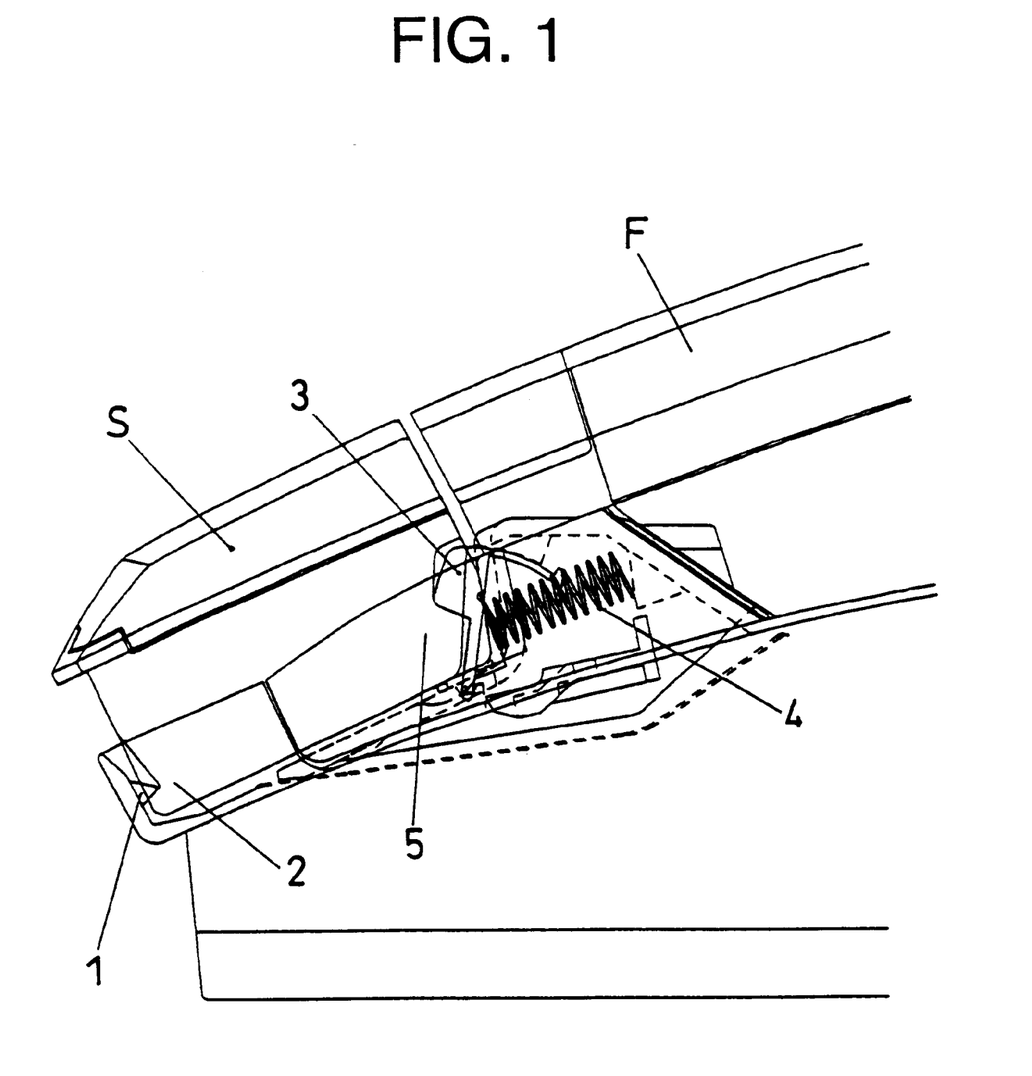
FIG. 1 is a side view of a characteristic portion of a first embodiment of the present invention, which shows a scanner in a mounted condition.

FIG. 1 is a side view showing a characteristic portion of the first embodiment of the present invention, which shows a scanner S mounted on a facsimile body F. The facsimile body F is provided with a latching pawl 1, which is engaged in a first notch 2 of the scanner S to latch the scanner S, and a locking pawl 3, which is fitted in a second notch 5 of the scanner S to lock the second notch 5 in engagement therewith. The scanner S is thereby held in the facsimile body F in position. In this connection, since the second notch 5 becomes deeper from the sides toward the center, the scanner S is held precisely in position relative to the facsimile body F.

Figure 2:
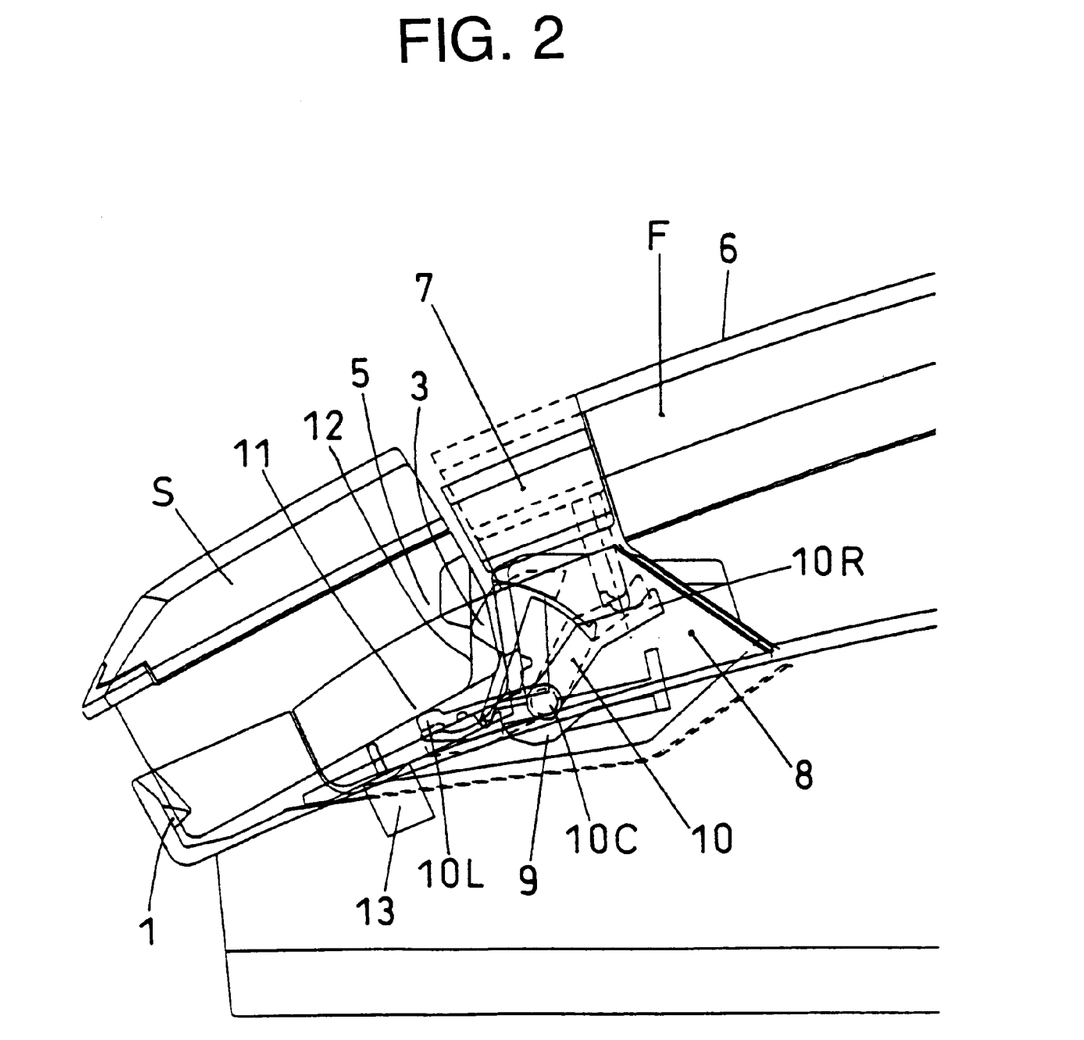
FIG. 2 is a side view of the characteristic portion of the first embodiment, which illustrates operation for releasing the scanner.

FIG. 2 is a side view showing the characteristic portion of the first embodiment, which illustrates detaching of the scanner S from the facsimile body F. When a release button 7 provided in a panel 6 of the facsimile body F is pushed to thereby lower a right end 10R of a release lever 10 supported by an upper cover 8 and a lever supporting plate 9, the release lever 10 is turned on a pivot 10C to give rise to protrusion of its left end 10L from the upper cover 8, thereby boosting a bottom 11 of the scanner S. In consequence thereof, the scanner S is pivotally turned on the latching pawl 1 of the facsimile body F, and the locking pawl 3 is withdrawn and disengaged from the second notch 5 of the scanner S against biasing force of a spring 4. Then, the locking pawl 3 slides along an underside of a lower slope 12 of the scanner S while returning to its initial position under the force of the spring 4. When the movement of the locking pawl 3 terminates, the scanner S is held in a raised condition with a rear portion of the scanner S protruding from the panel 6. In this connection, since the second notch 5 becomes deeper from the sides toward the center, the locking pawl 3 is permitted to smoothly pivot and withdraw from the second notch 5.

Figure 3:
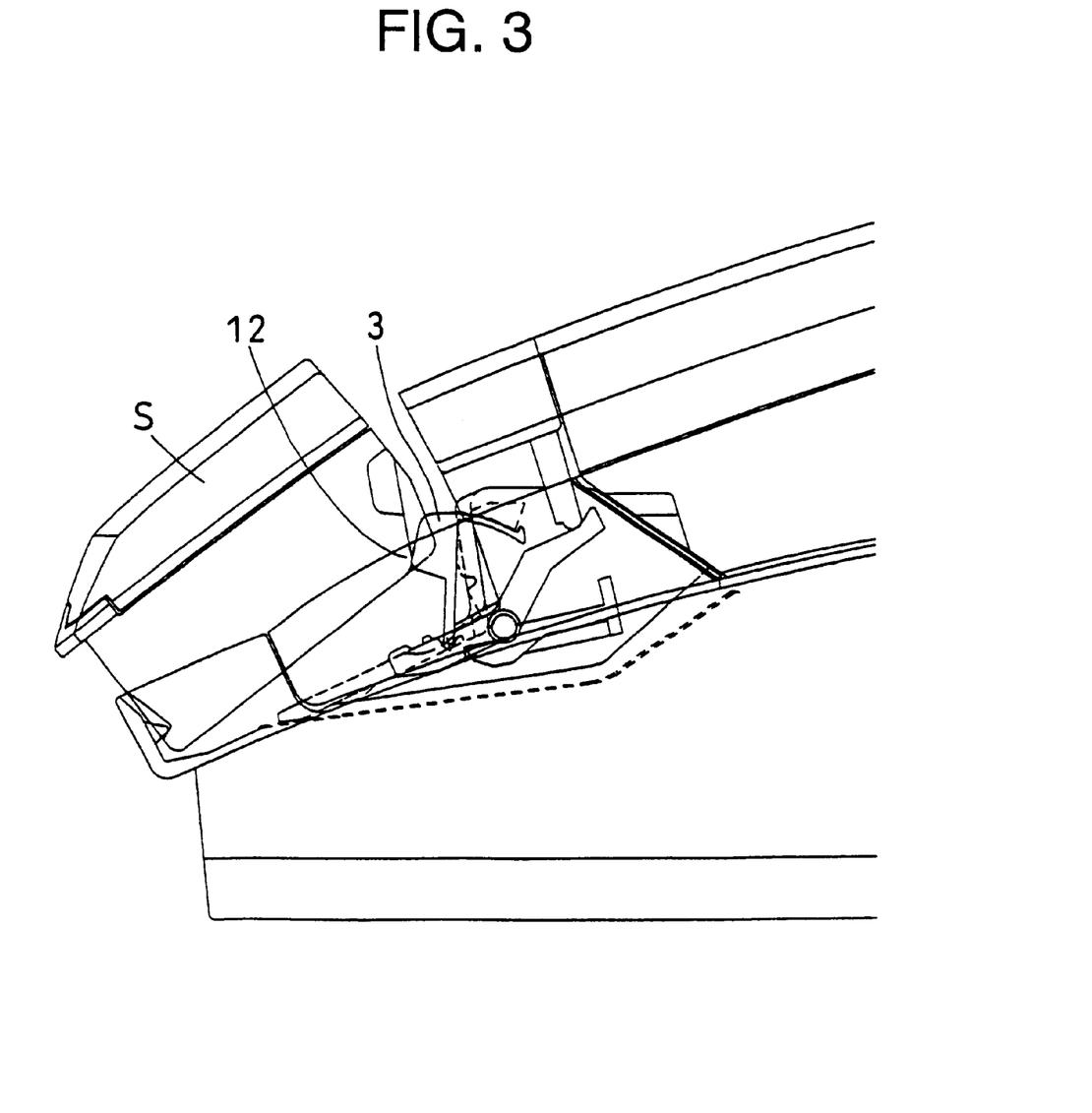
FIG. 3 is a side view of the characteristic portion of the first embodiment, which shows the scanner in a temporarily held condition.

FIG. 3 is a side view showing the characteristic portion of the first embodiment, which shows the scanner S held at a raised position, i.e., the scanner S in a temporarily held condition. The locking pawl 3 is stopped at a position where the spring 4 is less compressed than at the position in FIG. 1, and the locking pawl 3 supports the lower slope 12. From this condition, the scanner S can easily be taken up with a person's hand.

On the other hand, to mount the scanner S, the scanner S in the temporarily held condition shown in FIG. 3 is pushed from above. The locking pawl 3 is thereby turned against the force of the spring 4 to retreat. Accordingly, the scanner S can be mounted in position. This results in the scanner S returned to the mounted condition shown in FIG. 1.

When the scanner S is disengaged as shown in FIG. 2, a switch 13 is "on" to indicate the disengagement of the scanner S.

Figure 4:
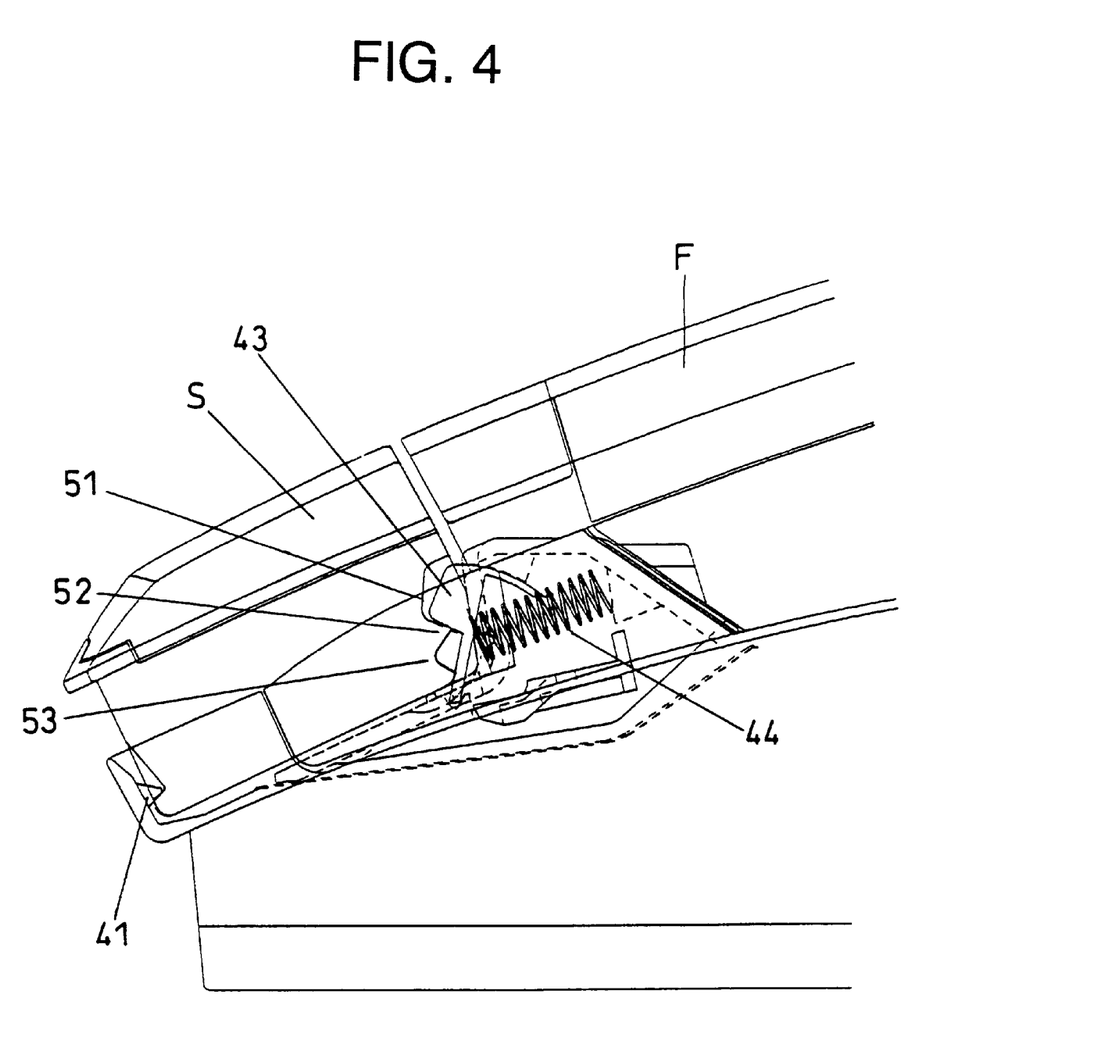
FIG. 4 is a side view of a characteristic portion of a second embodiment of the present invention, which shows a scanner in a mounted condition.

FIG. 4 is a side view showing a characteristic portion of the second embodiment of the present invention, which shows a scanner S mounted on a facsimile body F. In the first embodiment, in a case where the facsimile body F is disposed at a slanted place in a front-lower manner, if the scanner S is boosted up by operating the release button 7, the scanner S can fall off beyond the temporarily held condition due to momentum of the boost of the scanner S.

At a facsimile display site in a shop, with a view to attaining satisfactory appeal to customers, facsimiles tend to be placed in a slanted condition but not in a horizontal condition in which they are usually used. In such a slanted condition, if a customer operates the release button 7, the scanner S can fall off.

To cope therewith, the first embodiment is improved on while maintaining its advantageous feature, thereby providing this embodiment. Below a second notch 51 of a scanner S, a third notch 53 is further provided. In FIG. 4, the scanner S is held in a facsimile body by engagement between a locking pawl 43 and the second notch 51 under biasing force of a spring 44.

Figure 5:
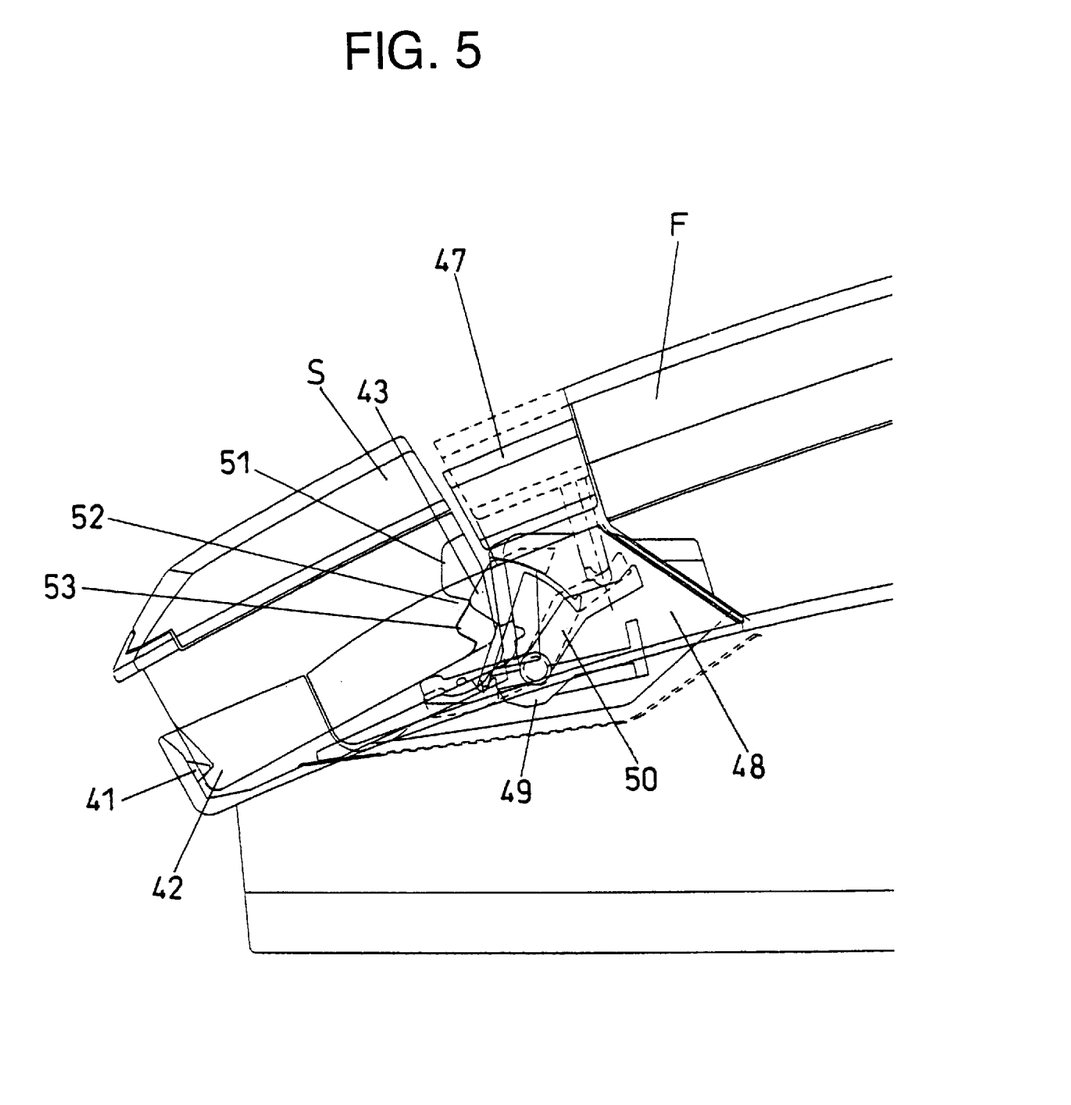
FIG. 5 is a side view of the characteristic portion of the second embodiment, which illustrates operation for releasing the scanner.

FIG. 5 is a side view showing the characteristic portion of the second embodiment, which illustrates detaching of the scanner S from the facsimile body F. The operation is basically the same as in the first embodiment. In the second embodiment, the third notch 53 is provided in addition to the second notch 51. Accordingly, when a release button 47 is depressed to thereby cause a release lever 50 to boost the scanner S, the locking pawl 43 is withdrawn and disengaged from the second notch 51 to fit into the third notch 53 beyond a first protrusion 52. In this connection, it is desired that when the release button 47 is fully depressed, the scanner S be moved by the action of the release lever 50 just in the amount which permits the locking pawl 43 to fit into the third notch 53.

Figure 6:
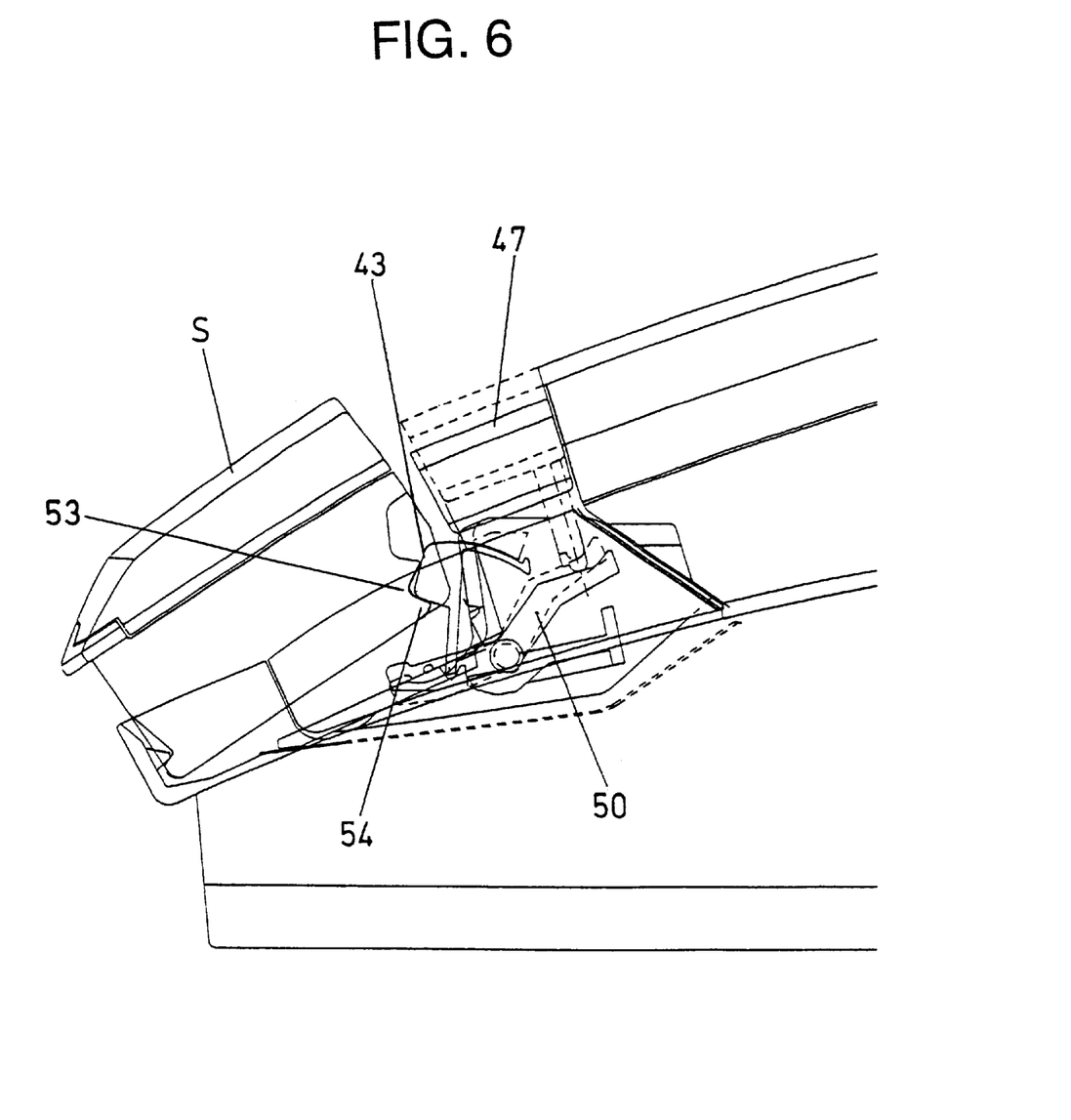
FIG. 6 is a side view of the characteristic portion of the second embodiment, which shows the scanner in a temporarily held condition.

FIG. 6 is a side view showing a characteristic portion of the second embodiment, which shows the scanner S held at a raised position, i.e., the scanner S in a temporarily held condition. The locking pawl 43 is in engagement with the third notch 53 beyond the first protrusion 52, and the scanner S is temporarily held in an intermediate condition of detaching under the biasing force of the spring 44. By virtue of this, the scanner S is temporarily held without rear supporting engagement of locking pawl 3 with the scanner S in the first embodiment and thus, if the facsimile body F is slantwise placed, the scanner S can fall off to a floor due to momentum of the boost of the scanner S depending upon an angle of the slant, whereas such disadvantage is prevented in this embodiment.

Figure 7:
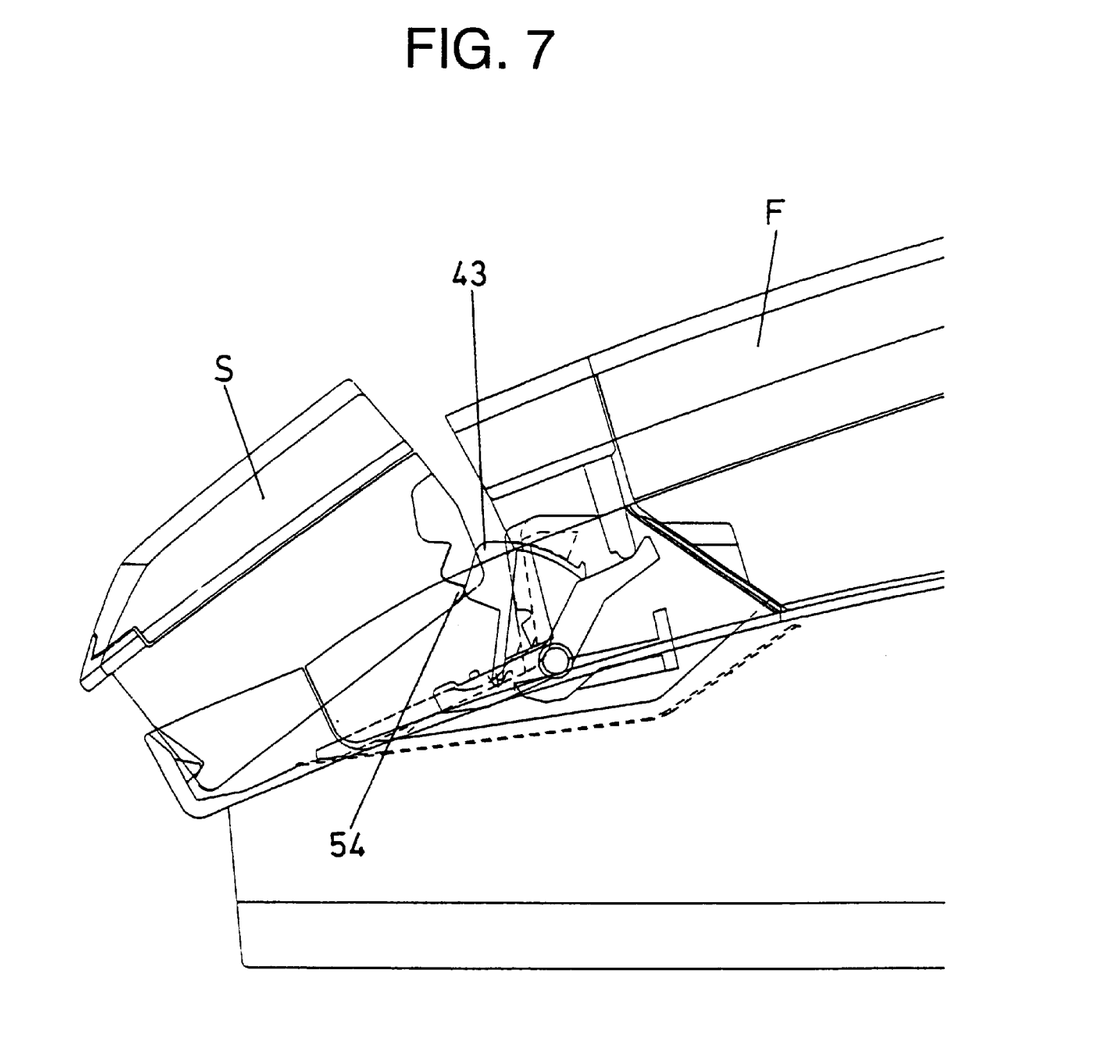
FIG. 7 is a side view of the characteristic portion of the second embodiment, which illustrates operation for releasing the scanner from the temporarily held condition.

FIG. 7 is a side view showing the characteristic portion of the second embodiment, which shows the scanner S brought from the temporarily held condition into a condition for detaching with a hand. The locking pawl 43 is brought into disengagement from the third notch 53 beyond a second protrusion 54.

On the other hand, to mount the scanner S, the scanner S in the condition for detaching shown in FIG. 7 is pushed from above. The locking pawl 43 is thereby turned against the force of the spring 44 to retreat. Accordingly, the locking pawl 43 fits in the third notch 53 beyond the second protrusion 54 and further fits in the second notch 51 beyond the first protrusion 52, and the scanner S is thereby mounted on the facsimile body F in position. This results in the scanner S returned to the mounted condition shown in FIG. 4.

It is to be noted that the present invention is by no means restricted to the above-described embodiments.

Instead of the spring, another member may be used so long as it is elastic. Alternatively, the locking pawl itself may be made of an elastic material.

The detection means for detecting whether or not the scanner is mounted on the facsimile body maybe one mechanically, electrically, magnetically or optically detecting a displacement.

The second notches 5, 51 and the third notch 53 may be semi-cylindrical so long as the locking pawls 3, 43 are appropriately engageable with the semi-cylindrical walls thereof.

Locking pawls may be provided in order to lock the second notch 51 and the third notch 53, respectively.

The release lever is not restricted to mechanically operated one and may be electrically or magnetically operated one.

As described above, according to the present invention, there is provided a facsimile which is free from the restrictions on the design and thus may be so designed as to meet user's preference and which has improved manageability. Accordingly, the facsimile is preferred from the practical viewpoint.

What is claimed is:

1. A facsimile provided with a detachable scanner, said facsimile comprising:
   a locking pawl for locking said scanner under biasing force of an elastic member to hold said scanner in a facsimile body, and
   a release lever for unlocking said scanner against the biasing force of said elastic member,
   wherein the scanner has a notch for receiving a tongue of the locking pawl.

2. The facsimile according to claim 1, further comprising a release button for operating said release lever, said release button having a push head substantially flush with a panel of said facsimile body, said release lever being operated by pushing said push head.

3. The facsimile according to claim 1, further comprising detection means for detecting whether or not said scanner is mounted on said facsimile body.

4. The facsimile according to claim 1, wherein said scanner is provided with a first notch in its side opposite to the side locked by said locking pawl, and said facsimile body is provided with a latching pawl so protruding as to face said first notch for latching said first notch, and said first notch and said latching pawl constitute a pivot when said scanner is unlocked.

5. The facsimile according to claim 1, wherein said scanner is provided with a second notch facing said locking pawl for receiving said locking pawl when said scanner is mounted on said facsimile body, and said second notch, at least in part, becomes deeper from sides to the center.

6. The facsimile according to claim 1, wherein said scanner is provided with a second notch facing said locking pawl for receiving said locking pawl when said scanner is mounted on said facsimile body, and said scanner is provided with a third notch at a position different from that of said second notch, and said third notch receives said locking pawl to lock said scanner and thereby hold said scanner in said facsimile body in a manner shallower than that by means of said second notch.

7. The facsimile according to claim 6, wherein the amount of the movement of said lever is, at the maximum, such that said scanner is moved to unlock said second notch and to lock said third notch.

8. The facsimile according to claim 1, wherein when said scanner is unlocked, said locking pawl is capable of abutting on a rear lower slope of said scanner under the biasing force of said elastic member to temporarily hold said scanner with a rear portion of said scanner protruding from the panel of said facsimile body.

9. The facsimile according to claim 1, wherein the locking pawl is directly attached to the facsimile body.

10. The facsimile according to claim 1, wherein the scanner is completely removable from the facsimile body.

* * * * *